(12) United States Patent
Perez

(10) Patent No.: US 9,094,331 B2
(45) Date of Patent: Jul. 28, 2015

(54) METHOD AND APPARATUS FOR INTERNET PROTOCOL (IP) LOGICAL WIRE SECURITY

(71) Applicant: Verizon Patent and Licensing Inc., Basking Ridge, NJ (US)

(72) Inventor: John Scott Perez, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 285 days.

(21) Appl. No.: 13/735,262

(22) Filed: Jan. 7, 2013

(65) Prior Publication Data

US 2014/0192675 A1     Jul. 10, 2014

(51) Int. Cl.
*G06F 15/173*     (2006.01)
*H04L 12/703*     (2013.01)
*H04L 12/751*     (2013.01)

(52) U.S. Cl.
CPC ............. *H04L 45/28* (2013.01); *H04L 45/02* (2013.01)

(58) Field of Classification Search
CPC ....... G06F 11/00; G06F 11/10; G06F 15/173; H04M 1/66; H04M 11/04; H04L 12/56; H04L 12/26; H04L 29/06; H04W 24/04
USPC ......... 370/225, 235, 245, 252, 254, 349, 389, 370/392, 395.1, 397, 401, 419; 455/411, 455/423; 709/207–224
See application file for complete search history.

(56) References Cited

U.S. PATENT DOCUMENTS

| | | | |
|---|---|---|---|
| 8,627,447 B1 * | 1/2014 | Chickering | 726/13 |
| 2003/0097439 A1 * | 5/2003 | Strayer et al. | 709/224 |
| 2006/0248370 A1 * | 11/2006 | Almasi et al. | 714/4 |
| 2008/0304631 A1 * | 12/2008 | Vilis et al. | 379/45 |
| 2010/0153540 A1 * | 6/2010 | Li et al. | 709/224 |
| 2012/0233311 A1 * | 9/2012 | Parker et al. | 709/224 |
| 2013/0324110 A1 * | 12/2013 | Kenington et al. | 455/423 |

* cited by examiner

*Primary Examiner* — Bob Phunkulh
*Assistant Examiner* — Wali Butt

(57) ABSTRACT

A method and apparatus for improved approaches for detection of exploits and drift in a network is described. The method includes: determining, by a processor, a logical configuration of a network comprising a plurality of links connecting a plurality of nodes; determining, by the processor, a physical path corresponding to one of the links, the physical path including a plurality of switches of the network, wherein the processor is configured to determine whether data sent on one of the nodes to another one of the nodes by the one link is received at the other node; receiving an error detection value computed by one of the switches; and determining, by the processor, whether the error detection value corresponds with a value inaccessible to the one switch.

22 Claims, 9 Drawing Sheets

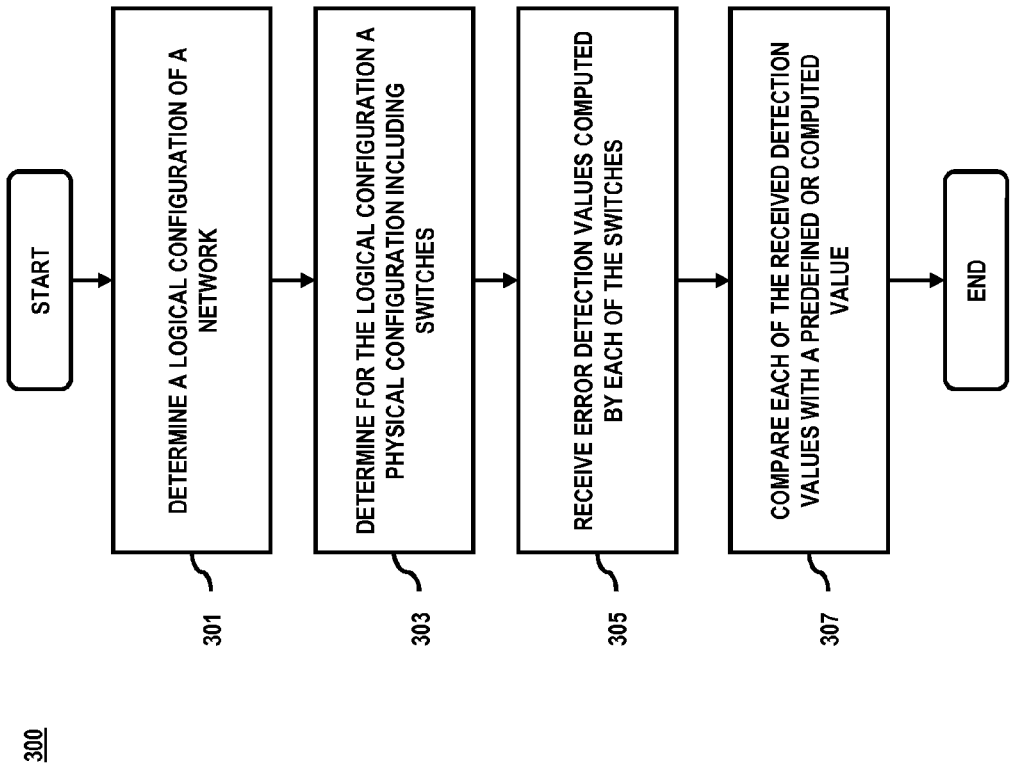

METHOD AND APPARATUS FOR INTERNET PROTOCOL (IP) LOGICAL WIRE SECURITY

BACKGROUND INFORMATION

Networking technologies using IP technologies offer users the flexibility to handle video, data, and voice. Additionally, IP technologies operate at a reduced cost than other telecommunication technologies, for instance, signaling system v7 (SS7). However, IP technologies, such as voice over the internet protocol (VOIP), session initiation protocol (SIP), session description protocol (SDP), and the like, may be exploited. For instance, the automatic number indicator (ANI), also known as "caller ID" of a calling party may be falsified using an ANI exploit. Furthermore, networks using such IP technologies may experience a drift of logical and physical configurations, for example, due to modifications to the physical network without updating a system tracking changes to the network. Performing a line by line interrogation of physical tables and logical route tables to ensure proper configuration requires a significant computation effort and telemetry bandwidth impacting network performance, and thus is not feasible in large scale systems.

Therefore, there is a need for approaches to detect exploits and a drift of a large scale network to provide better security in networks utilizing IP or equivalent technologies.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3 and 4 are flowcharts of processes for detecting exploits and drift in a network, according to one embodiment;

DESCRIPTION OF THE PREFERRED EMBODIMENT

A preferred method and system for detecting exploits and drift in a network is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
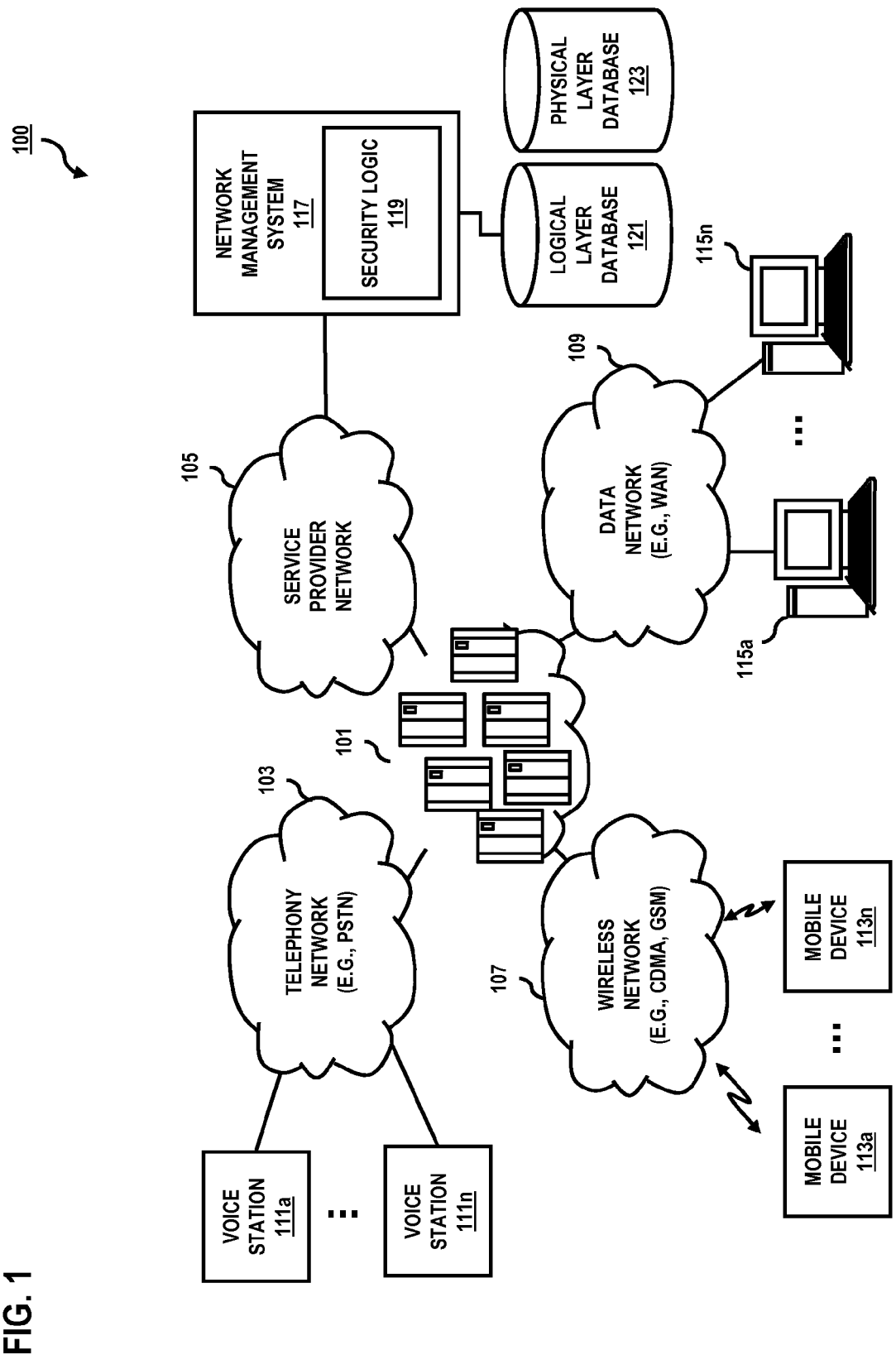
FIG. 1 is a diagram of a communication system capable of detecting exploits and drift of a network, according to various embodiments.

FIG. 1 is a diagram of a communication system capable of detecting exploits and drift of a network, according to various embodiments. For illustrative purposes, system 100 is described with respect to an IP network 101 to connect networks. In this example, the IP network 101 is configured to establish network connectivity between a telephony network 103, a service provider network 105, a wireless network 107, and a data network 109. For example, the IP network 101 may be a meshed multi-path data networking cloud core portion using backbone fiber transmission for core switch/routers and include, for instance, 3G/4G wireless towers and edge routers along an edge of the cloud. As shown, telephony network 103 uses time division multiplexed (TDM) communications for SS7 with a physical wire layout. Telephony network 103 is configured to allow connectivity of a voice station 111a (e.g., plain old telephone service (POTS) device) to voice station 111n connected to the telephony network 103, another voice station (not shown) connected to another telephony network (not shown) connected to the IP network 101, or another device of yet another network connected by IP network 101, such as mobile device 113a of wireless network 107 and computing device 115 (e.g., laptop, desktop, web appliance, netbook, etc.) of data network 109. The service provider network 105 may include a network management system 117 (e.g., a Back office) having security logic 119 and access to a logical layer database 121 and a physical layer database 123 corresponding to the IP network 101. As such, the network management system 117 monitors equipment (e.g., switches/routers) of the IP network 101 to improve security and reliability of the IP network 101. In some embodiments, the network management system 117 is Sarbanes Oxley (SOX) compliant, and thus changes relative to IP network 101 are tracked and non-repudiated. The network management system 117 may be utilized in a telecommunication network management (TNM) process.

As mentioned, detecting exploits and drift in a network involves significant computational resources and telemetry bandwidth. As such, continuous stateful detection of networks (e.g., IP network 101) is not feasible, especially for large scale networks. Utilizing frequency trending algorithms allows a stateful detection to be dynamically performed on a portion of a network (e.g., a logical wire). However, information from a switch/router fabric used by such trending algorithms may be remotely exploited or have a modified configuration. As such, trending algorithms may not initiate a dynamic stateful detection when an exploit or modification impacts a switch/router fabric of a network and thus, the exploits and/or modifications may remain undetected.

To address this issue, the system 100 of FIG. 1 introduces the capability to verify information from a switch/router fabric enabling an enhanced detection of exploits and/or modifications in a large scale network. By way of example, each switch of the IP network 101 computes an error detection value (e.g., checksum) for data stored in a corresponding routing table and configuration of the switch, and sends the error detection value (e.g., a binary value) to network management system 117. The network management system 117 then verifies (and validates) a routing table of a switch when a received error detection value is identical to a predefined value. As such, the use of error detection values to verify switches/routers enables a switch/routing fabric of a network to be verified without a continuous stateful inspection. Furthermore, when a received error detection value does not match the corresponding predefined value (or value computed by a network management system), auditing of a switch/router, logical/physical route, and/or portion of the IP network 101 may be initiated to determine a cause for the mismatch. As such, computation and telemetry resources of the IP network 101 may be preserved since only a portion of the IP network 101 is audited rather than the entire network. Further, network management system 117 may be configured to compare a physical path of network traffic within IP network 101 to a physical path indicated by the network traffic. As such, when the physical paths are not matched the network management system 117 may be configured to restrict and/or initiate a dynamic stateful inspection of the logical and physical routes of the IP network 101.

As used herein, exploits of a network include, for example, a modification of the open systems interconnection (OSI) model layers 3-7 to spoof an IP address of an IP packet and force it into a logical cloud (e.g., IP network 101) from an edge so that it may be routed to another IP destination. In another example, a MAC hex address of a device is altered by modifying a firmware or driver of a network interface card (NIC). In yet another example, an ANI of network traffic is modified (e.g., ANI spoofing) in the session initiation protocol (SIP) application layer protocol running over a TCP or UDP on top of the IP protocol. Additional exploits of the layers 3-7 include protocols such as, for example, simple network management protocol (SNMP), TELNET, and simple mail transfer protocol (SMTP).

Although depicted as separate entities, the networks 101-109 may be completely or partially contained within one another, or may embody one or more of the aforementioned infrastructures. For instance, the service provider network 105 may embody circuit-switched and/or packet-switched networks that include facilities to provide for transport of circuit-switched and/or packet-based communications. It is further contemplated that the networks 101-109 may include components and facilities to provide for signaling and/or bearer communications between the various components or facilities of the system 100. In this manner, the networks 101-109 may embody or include portions of a SS7 network, Internet protocol multimedia subsystem (IMS), or other suitable infrastructure to support control and signaling functions.

The networks 101-109 may be any suitable wireline and/or wireless network, and be managed by one or more service providers. For example, the data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 115 may be any suitable computing device, such as a VoIP phone, skinny client control protocol (SCCP) phone, session initiation protocol (SIP) phone, IP phone, personal computer, softphone, workstation, terminal, server, etc. The telephony network 103 may include a circuit-switched network, such as the public switched telephone network (PSTN), an integrated services digital network (ISDN), a private branch exchange (PBX), or other like network. For instance, voice station 111 may be any suitable POTS device, facsimile machine, etc. Meanwhile, the wireless network 107 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

As used herein, IP network 101 is configured to utilize public IP routing, for example, utilizing publicly routed IP subnet address space provided by the internet assigned number authority (IANA). As such, end users may acquire a public address dynamically (or statically) from an internet service provider (ISP), for instance, service provider network 105. Additionally, the IP network 101 may comprise a plurality of independently monitored and controlled IP networks. Further, such a plurality of IP networks can initiate the processes illustrated in FIGS. 1 though 6 dynamically to determine end-to-end logical and physical connections across IP network 101.

As used herein, mobile devices 113 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 113 may support any type of interface for supporting the presentment or exchange of data. In addition, mobile devices 113 may facilitate various input means for receiving and generating information, including touch screen capability, keyboard and keypad data entry, voice-based input mechanisms, accelerometer (e.g., shaking the mobile device 113), and the like. Any known and future implementations of mobile devices 113 are applicable. It is noted that, in certain embodiments, the mobile devices 113 may be configured to transmit information (e.g., audio signals, words, address, etc.) using a variety of technologies—e.g., NFC, BLUETOOTH, infrared, etc. Also, connectivity may be provided via a wireless local area network (LAN). By way of example, a group of mobile devices 113 may be configured to a common LAN so that each device can be uniquely identified via any suitable network addressing scheme. For example, the LAN may utilize the dynamic host configuration protocol (DHCP) to dynamically assign "private" DHCP IP addresses to each mobile device 113, e.g., IP addresses that are accessible to devices connected to the service provider network 105 as facilitated via a router. Some mobile device 113 may be configured to utilize serial numbers for radio communication authentication to reduce spoofing of the device, and to improve accuracy of monitoring statistical trending behavior of the network.

In certain embodiments, network management system 117 may include or have access to logical and physical layer configuration information of the IP network 101 stored in logical layer database 121, and physical layer database 123, respectively. Physical layer configuration may include networking hardware, such as physical links connecting switches and/or routers, properties such as frequencies, modulation schemes, character encoding, transmission, reception and decoding methods, physical link distances, error correction schemes, physical network topology (e.g., bus, ring, mesh, star), protocols (e.g., DSL, ISDN, SONET, BLUETOOTH, etc.), and the like. Logical layer configuration may include nodes and pathways representing data transfers between points of the physical layer configuration. Additionally, multiple network management systems (e.g., 117) may access a single or multiple logical layer databases (e.g., 121) and/or physical layer databases (e.g., 123). The physical and/or logical configurations stored in the databases 121 and 123, respectively, may be real time and track changes for acceptance (e.g., non-repudiated) by a Back Office. The network management system 117 may be configured to access and store information simultaneously from switches and routes of IP network 101 into one or more logs (e.g., databases 121 and/or 123) to facilitate a detection (e.g., dynamic/continuous stateful inspection) of exploits and/or drift of the IP network 101.

While specific reference will be made thereto, it is contemplated that the system 100 may embody many forms and include multiple and/or alternative components and facilities.

Figure 2A:
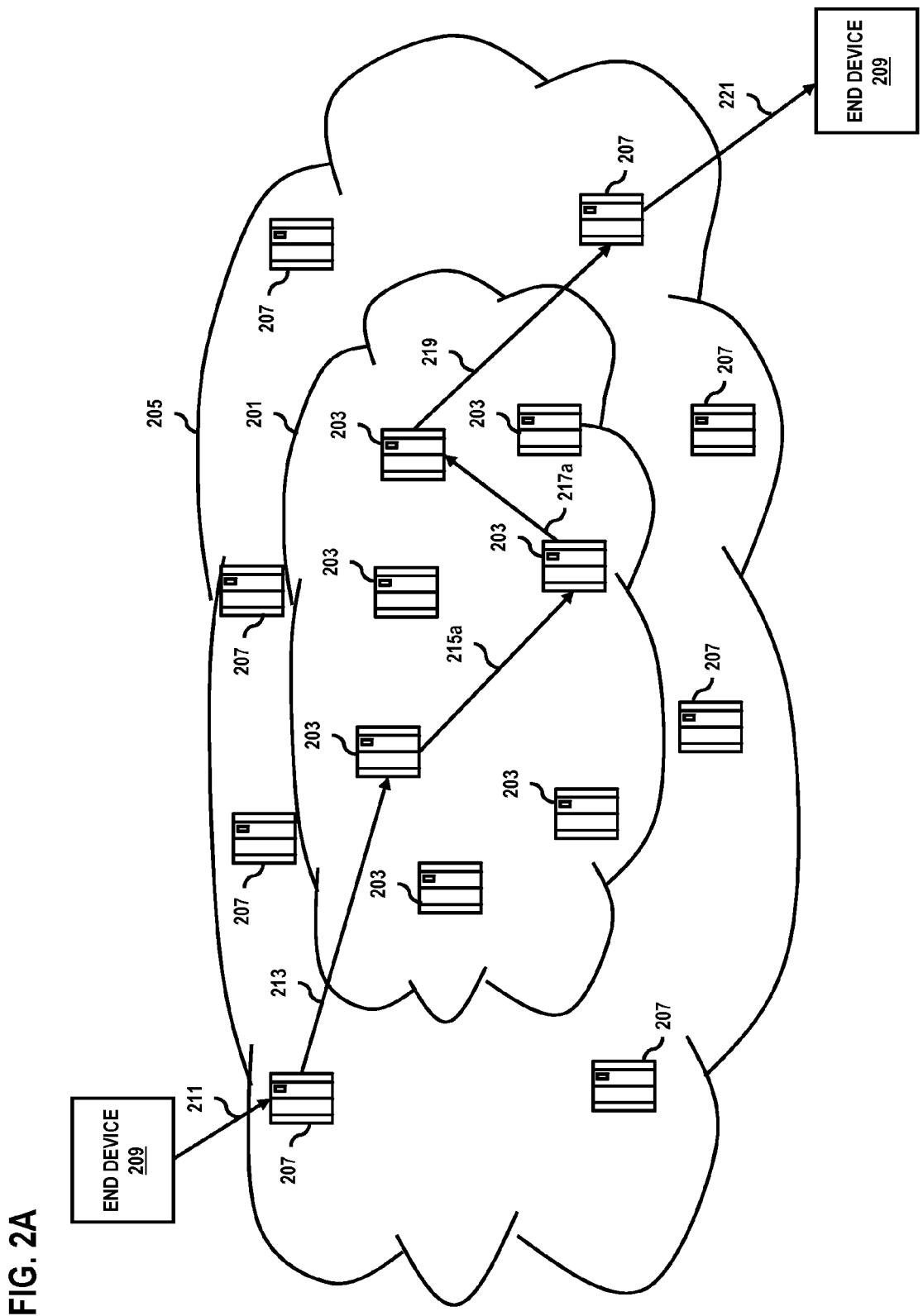
FIGS. 2A and 2B are diagrams of the components of an IP network, according to exemplary embodiments.
Figure 2B:
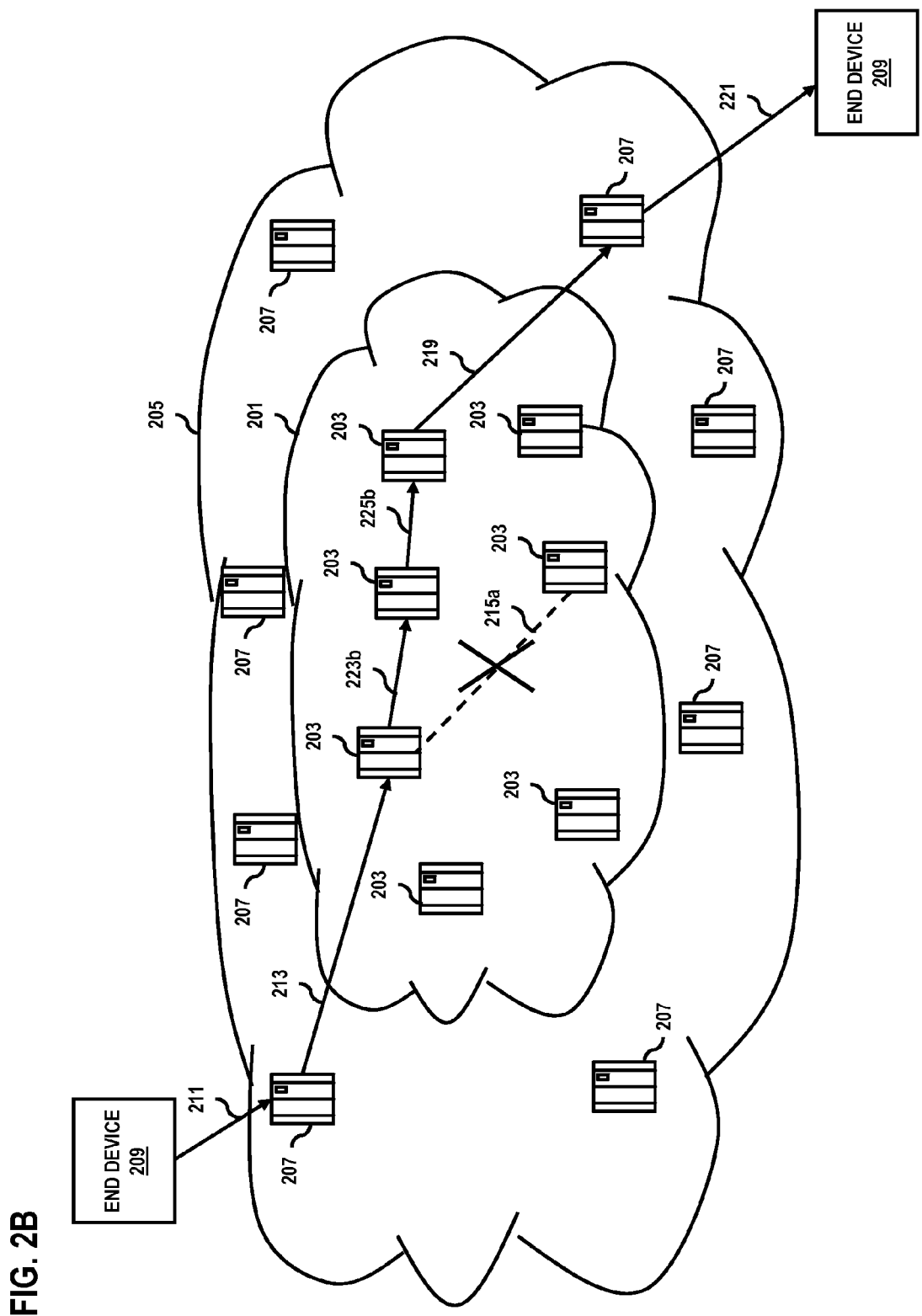

By way of example, FIGS. 2A and 2B are diagrams of the components of an IP network, according to exemplary embodiments. As illustrated in FIGS. 2A and 2B, the IP network includes a core network 201 with core routers 203 surrounded by an edge network 205 with edge routers 207. End devices 209 exchange network traffic by each connecting to edge routers 207 which then forward the network traffic using core routers 203. In some embodiments, the network traffic of the core network 201 and edge network 205 is monitored by a network management system (e.g., 117). Adverting to FIG. 2A, network data is exchanged between end devices 209 via a first physical path 211 between the end device 209 and edge router 207, a second physical path 213 between the edge router 207 and core router 203, third and fourth physical paths 215a and 217a, respectively, between core routers 203, a fifth physical path 219 between core router 203 and edge router 207, and a sixth physical path 221 between edge router 207 and end device 209. Adverting to FIG. 2B, physical path 215a is unavailable. As such, routing logic forwards the network traffic similar to FIG. 2A, except network traffic within the IP network 101 is transported via first and second alternate physical paths 223b and 225b instead of the third and fourth physical paths 215a and 217a, respectively. The routing logic is stored in one or more of the core routers 203 and/or a network management system (e.g., 117). For example, the network management system may receive an indication from one or more of the core routers 203 that the physical path 215a is unavailable (e.g., latency exceeding a predefined threshold) and send updated routing tables to the core routers 203 indicating a new logical path corresponding to the alternate physical paths 223b and 225b. In another example, one or more of the core routers 203 detect that a logical path utilizing the physical path 215a is unavailable (e.g., received no confirmation that a datagram was received within a time period) and each routing table of the core routers 203 are updated to indicate a new logical path utilizing the alternate physical paths 223b and 225b.

FIG. 3 is a flowchart of a process for detecting exploits and drift in a network, according to one embodiment. For illustrative purpose, process 300 is described with respect to the systems of FIGS. 1, 2A, and 2B. It is noted that the steps of process 300 may be performed in any suitable order, as well as combined or separated in any suitable manner.

In step 301, the network management system 117 determines a logical configuration of IP network 101. For instance, the network management system 117 receives a message from a core router 203 indicating a packets transmitted on a first logical route fail to be received, and the network management system 117 sends updated routing tables to core routers 203 indicating an alternative logical route and updates the logical layer database 121 accordingly. In another example, the network management system 117 accesses logical layer database 121 to determine a stored logical configuration. In step 303, the network management system 117 determines a physical configuration for the logical configuration of IP network 101. For instance, the network management system 117, determines network traffic transported by physical path 215a has a bit error rate (BER) exceeding the predefined value, and the network management system 117 sends updated routing tables to core routers 203 indicating logical routes utilizing physical paths 223b and 225b rather than physical paths 215a and 217a and updates the physical layer database 123 accordingly. Alternatively, the network management system 117 may receive a message from one or more routers (e.g., 203 and/or 207) indicating a first logical route is unavailable and the network management system 117 sends updated routing tables to core routers 203 indicating routes utilizing physical paths 223b and 225b rather than physical paths 215a and 217a and updates the physical layer database 123 accordingly. In yet another example, the network management system 117 accesses physical layer database 123 to determine a stored physical configuration.

Next, the network management system 117 receives, as in step 305, an error detection value from each of the core routers 203 and edge routers 205. For example, each of the routers 203 and 205 receives an algorithm distributed by the network management system 117. Next, each of the routers 203 and 205 executes the algorithm to compute a bitvalue using a current device configuration (e.g., firmware version, device model number, MAC address, etc.) and/or a current datastore (e.g., file size, routing table values, etc.). The bitvalue is then received via the networks 101-109 by the network management system 117. In some embodiments, the bitvalue is transmitted by an encrypted communication, such as SSL, and/or is isolated to a module or virtual machine (VM) with only secure access. As such, a visibility of the bitvalues may be restricted to a particular system(s) and/or administration community. Furthermore, the VM may have segregated resources utilizing a private network (e.g., customer network 603).

The network management system 117 then compares, as in step 307, each of the received detection values with pre-defined and/or computed values. For instance, the network management system 117 computes a bitvalue for each of the routers 203 and 205 according to configurations stored in databases 121 and 123 (and another database) and compares the computed bitvalues to the corresponding received bitvalue. In another example, the network management system 117 compares the received bitvalues with a log (not shown) containing predetermined bitvalues.

The network management system 117 may initiate a cross enterprise customer network security trending based on the comparison. For example, the network management system 117 may include VERIZON WEBZ using a spider subsystem analysis of network data utilizing data from routers 203 and 205 when the (computed) bitvalues match to the received bitvalues. As such, the network management system 117 can determine, in real time, whether a particular IP address has been involved in other recent specific activity and, for instance, initiate an ACL block on the particular IP address for a period of time. Furthermore, the comparison allows the network management system 117 to tie logical information to physical information enabling enhanced investigations of a network (e.g., 101). For example, logical and physical information from routers enables an identification of an origin of malicious encrypted IP traffic. In another example, the logical and physical information enables identification of a regional ingress location of painted targets (e.g., tracing synthetic information across multiple accounts). Such investigations may be in real time, using a trending database by a batch spider subsystem, or ad hoc.

Figure 4:
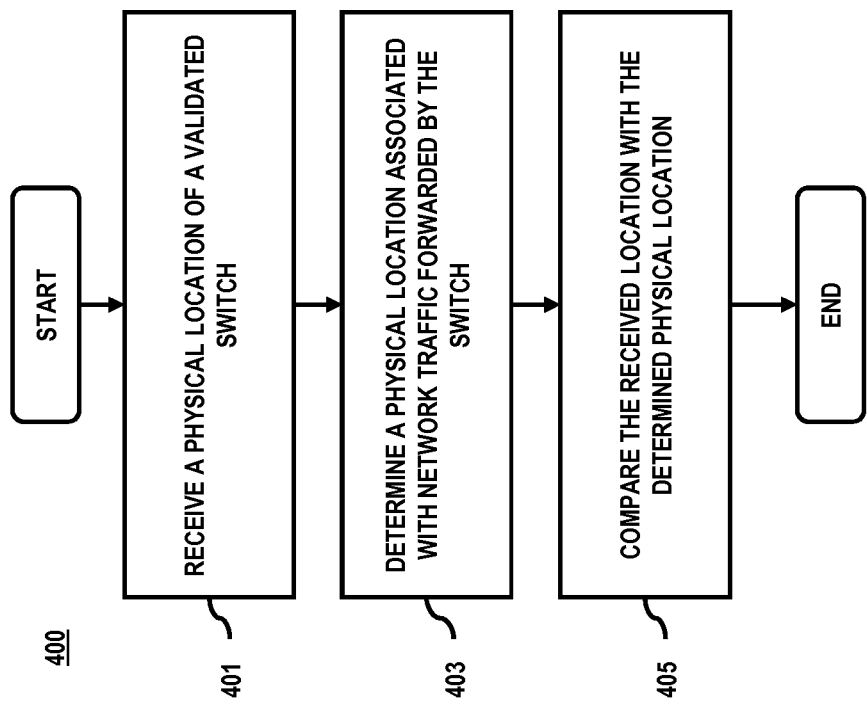

For illustrative purpose, process 400 of FIG. 4 is described with respect to the systems of FIGS. 1, 2A, and 2B. It is noted that the steps of process 400 may be performed in any suitable order, as well as combined or separated in any suitable manner.

In step 401, the network management system 117 receives a physical location of a validated switch. For instance, the network management system 117 designates the routers 203 and 205 as validated when the comparison in step 305 indicates the received and predefined values are identical. The network management system 117 then receives messages from each of the routers 203 and 205 indicating a corresponding geolocation of each of the routers 203 and 205.

In step 403, the network management system 117 determines a physical location associated with network traffic forwarded by the switch. In one embodiment, the network management system 117 determines the physical location based on information contained in network traffic (e.g., datagram). For example, the network management system 117 determines an ANI for a datagram and determines a geolocation for the ANI in a known number administration and portability list maintained by the number portability administration center (NPAC). In another example, the network management system 117 determines a physical location for a datagram based on a geolocation of an edge router 205 corresponding to an endpoint of a source and/or destination IP address for the datagram. Additionally, when a datagram indicates a location outside of a network, a geolocation of an edge router (e.g., 207) may be used as a physical location of the datagram. For example, each edge router 207 maintains a log indicating destination addresses of end devices (e.g., 209) connected to the IP network (e.g., 101, 205) by the edge router 207. In another example, the network management system 117 dynamically associates a geolocation of an edge router 207 connecting a destination address to the IP network with the destination address. In yet another example, the network management system 117 maintains a log (not illustrated) indicating destination addresses of each end device (e.g., 209) connected to the IP network by the edge routers 207.

In one embodiment, the network management system 117 determines one or more physical locations associated with network traffic based on a MAC addresses associated with network traffic. That is, the network management system 117 determines a type of endpoint device of the network traffic based on a MAC address associated with the endpoint device (e.g., mobile device 113, computing device 115, etc.) and associates known geolocations for the type of endpoint device with the network traffic. For example, a MAC address of network traffic may indicate an endpoint device of the network traffic is a gaming device associated with specific server locations for the gaming device utilizing certain protocols (e.g., TCP/IP, IPV4, etc). As such, the network management system 117 can determine typical geolocations (and protocols) associated with network traffic to/from the gaming device based on a MAC address of the network traffic. It is contemplated that processes improving an accuracy of MAC address of end devices may be utilized with the embodiments illustrated in FIGS. 1 through 6, for instance, use of a signed MAC incorporated in a fabrication process of end devices (e.g., 209) that cannot be modified by Berkeley (BSD) socked coding.

Next, in step 405, network management system 117 compares the received location with the determined physical location. For example, a geolocation associated with an ANI for a datagram is compared with the geolocation of each of the routers 203 and 205 forwarding the datagram. In another example, a geolocation associated with a source (or destination) IP address for a datagram is compared with the geolocation of each of the routers 203 and 205 forwarding the datagram. In yet another example, typical server locations associated with a MAC address are compared with the geolocations of each of the routers 203 and 205 forwarding the datagram. As such, network traffic (e.g., datagrams) purporting to be associated with a geolocation can be verified using geolocations of routers (e.g., 203 and 205) forwarding the network traffic. Furthermore, a confidence of geolocations indicated by the switches/routers can be enhanced by utilizing the steps illustrated in FIGS. 3 and 5 to verify and validate a configuration of the switches/routers.

Figure 5:
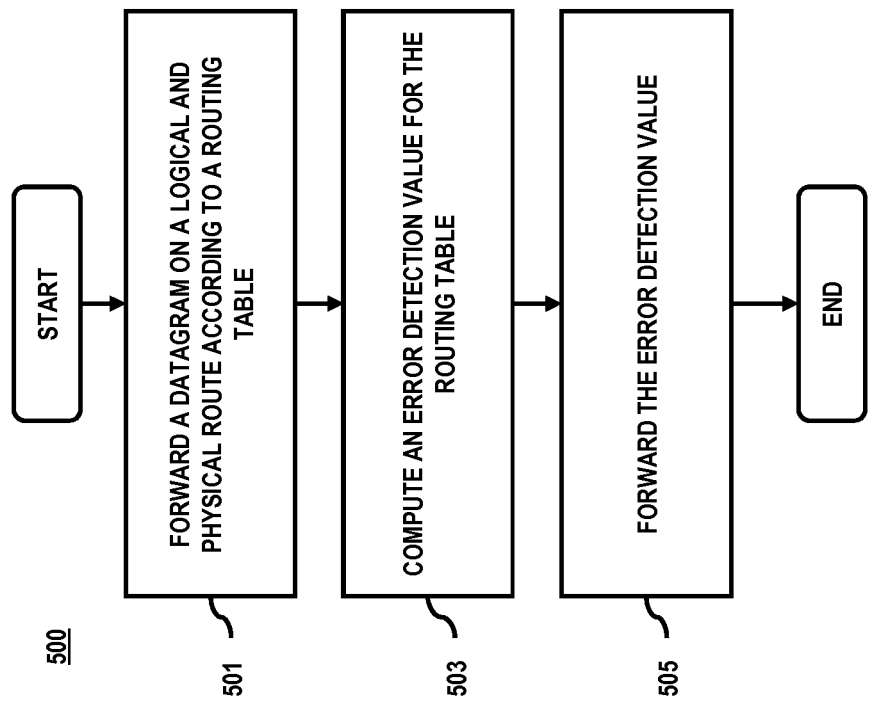
FIG. 5 is a flowchart of a process for validating a switch in a network, according to one embodiment.

FIG. 5 is a flowchart of a process for validating a switch in a network, according to one embodiment. For illustrative purpose, process 500 is described with respect to the systems of FIGS. 1, 2A, and 2B. It is noted that the steps of process 500 may be performed in any suitable order, as well as combined or separated in any suitable manner.

In step 501, a router (e.g., router 203 or 205) forwards a datagram on a logical and physical route according to a routing table. For example, the a first core router 203 receives a datagram from a second core router 203 and forwards the datagram to a third core router 203 by matching a destination address of the datagram with a route stored in a routing table for the first router 203. In some embodiments the routing table is selected and tracked by network management system 117 to conform to security logic 119 based on configuration information stored in logical and physical layer databases 121 and 123, respectively. Next, in step 503, the router computes an error detection value for the routing table and forwards, as in step 505, the error detection value. For instance, the router executes a checksum algorithm on a routing table stored in the router and on a firmware of the router and transmits the checksum to the network management system 117. In some embodiments, the checksum algorithm is included in a firmware and/or read-only memory (ROM) of the router. Additionally, the checksum algorithm may be computed by a trusted CPU designated to monitor another CPU configured to perform normal processes of the router.

Figure 6:
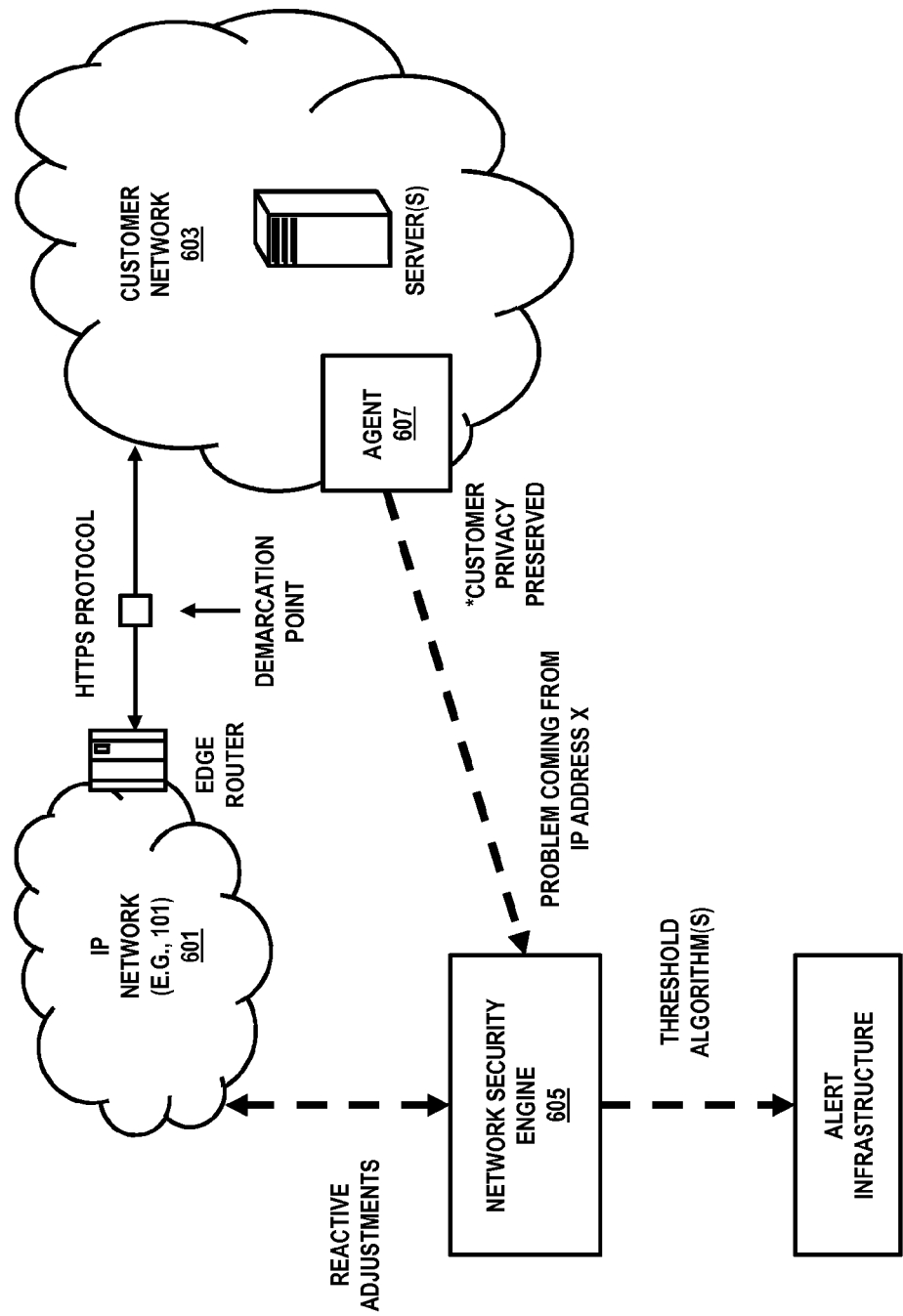
FIG. 6 is an illustration of one embodiment of detecting exploits and drift in private network traffic using a remote agent.

FIG. 6 is an illustration of one embodiment of detecting exploits in private network traffic using a remote agent. As shown, an IP network 601 (e.g., 101) exchanges encrypted network traffic (e.g., HTTPS, SSL) with a customer network 603 (e.g., data network 109) via a virtual private network (VPN). Additionally, customer network 603 may be regulated by government regulations (e.g., HIPAA) and affiliated with electronic commerce (e.g., SET financial transactions). As such, a network security engine 605 (e.g., 117) is unable to monitor network traffic characteristics, for instance, an ANI of network traffic and maintain the privacy of customer network 603. However, a remote agent 607 configured to monitor network traffic within the customer network 603 in real time can alert network security engine 605 of abnormal behavior (e.g., irregular traffic flows, rouge traffic flows, etc.) while maintaining the privacy of customer network 603. For instance, remote agent 607 may be configured with VERIZON WEBZ to statistically store and trend communication anomalies and notify network security engine 605 of alerts in generic terms (e.g., critical, major, minor, etc.) to suite customer network 603 via a public (or private) network using an encrypted VPN. In another example, VERIZON WEBZ notifies network security engine 605 of an IP address of communication origin and time of the event along with preconfigured information (e.g., IP gateways involved with the event). In yet another example, the remote agent 607 constructs internal notifications for suspicious user behavior (e.g., login failure, extended session, restricted access, etc.)

Further, the remote agent 607 may be configured to perform the method described with respect to FIG. 5 to enable verification (and validation) of a configuration of the remote agent 607. For instance, the remote agent 607 may compute an error detection value according to a checksum algorithm transmitted by network security engine 605 (or stored in a ROM in the remote agent 607) that is computed based on a firmware version, operating system, and a file size, of the remote agent 607 and send the resulting binary values to the network security engine 605. As such, the remote agent 607 may monitor the customer network 603 and be verified by the IP network 601 while maintaining the privacy of customer network 603. Although remote agent 607 is shown as part of customer network 603, the remote agent 607 may be within of a service provider network (e.g., 105), or even a cloud based (e.g., IP network 601). Remote agent 607 may be an application configured to support multiple types of operating systems (OS), for example, VERIZON WEBZ utilizing a POSIX complicate agent.

The processes described herein for detecting exploits and drift in a network may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
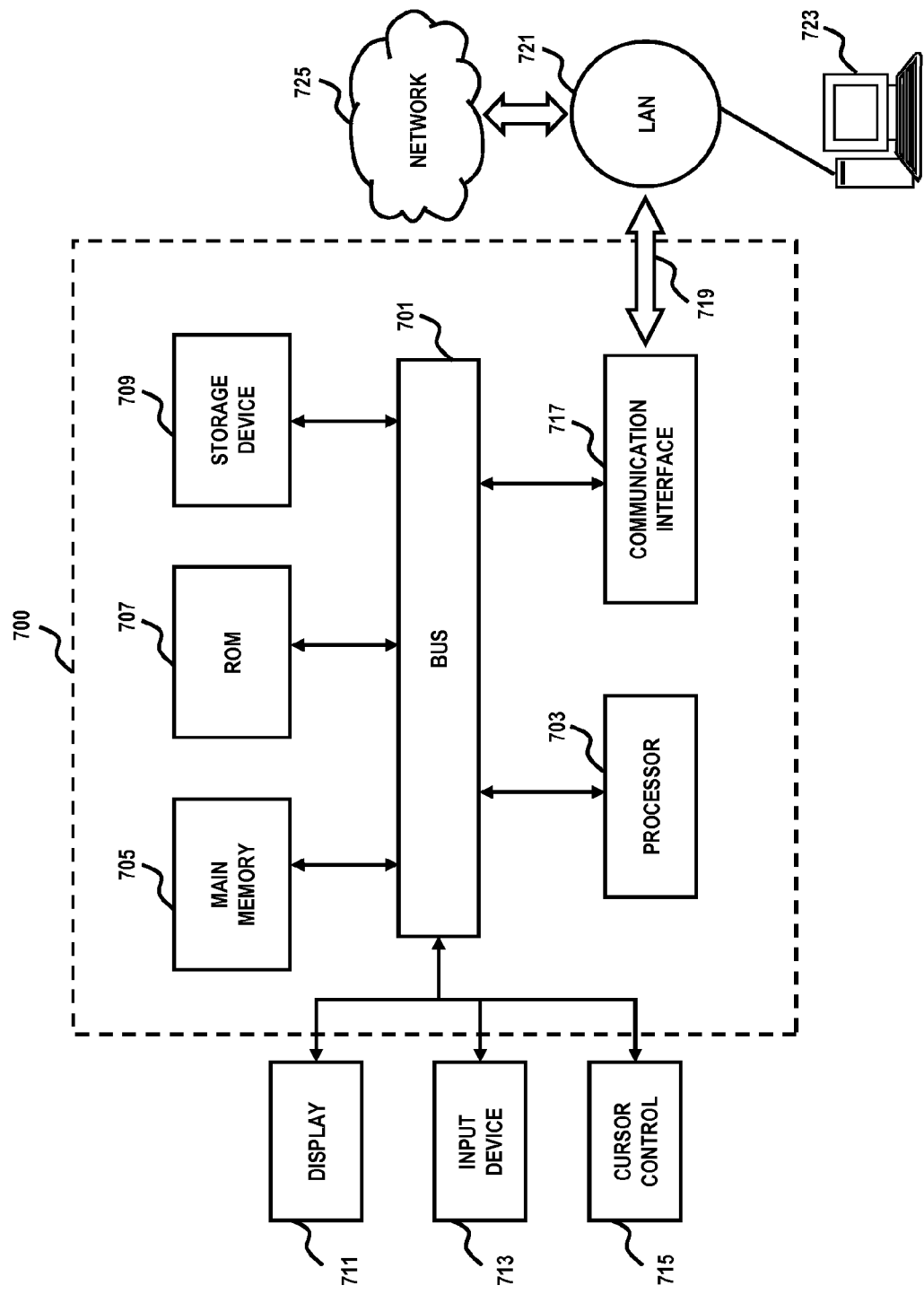
FIG. 7 is a diagram of a computer system that can be used to implement various exemplary embodiments.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk, flash storage, or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. Additional output mechanisms may include haptics, audio, video, etc. An input device 713, such as a keyboard including alphanumeric and other keys, is coupled to the bus 701 for communicating information and command selections to the processor 703. Another type of user input device is a cursor control 715, such as a mouse, a trackball, touch screen, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—e.g., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
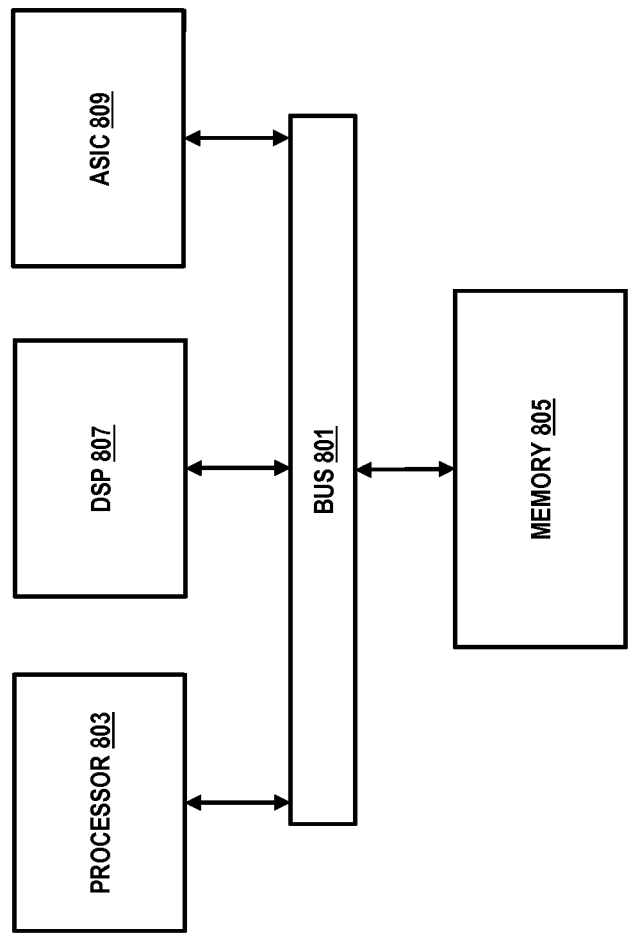
FIG. 8 is a diagram of a chip set that can be used to implement various exemplary embodiments.

FIG. 8 illustrates a chip set or chip 800 upon which an embodiment of the invention may be implemented. Chip set 800 is programmed to enable detection of an exploit in a network as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of enabling detection of an exploit in a network.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to enable detection of an exploit in a network. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining, by a processor, a logical configuration of a network comprising a plurality of links connecting a plurality of nodes;
   determining, by the processor, a physical path corresponding to one of the links, the physical path including a plurality of network switches of the network, wherein the processor is configured to determine whether data sent on one of the nodes to another one of the nodes via the one link is received at the other node;
   receiving an error detection value computed by one of the network switches using either data stored in one or more routing tables of the one network switch, a configuration type of the one network switch, or a combination thereof; and
   validating, by the processor, the one network switch as secured from one or more exploits of the network by determining that the error detection value is identical to a value inaccessible to the one network switch.

2. The method according to claim 1, comprising:
   receiving another error detection value computed by another one of the network switches;
   determining, by the processor, whether the other error detection value corresponds with another value, the other value being inaccessible to the one network switch and the other network switch;
   subsequently validating, by the processor, the other network switch as secured from the one or more exploits by determining that the other error detection value is identical to the other value;
   receiving a first and second geolocation from the one network switch and the other network switch switches, respectively; and
   determining, by the processor, a physical path of network traffic forwarded by the one network switch, other network switch, or a combination thereof based on the received first and second geolocations when the one network switch and the other network switch are validated.

3. The method according to claim 2, comprising:
   determining, by the processor, an indication of a physical location associated with the network traffic; and
   comparing the indication of the physical location with the determined physical path.

4. The method according to claim 3, comprising:
determining a source and/or destination address of a datagram of the network traffic; and
determining the indication of the physical location according to the source and/or destination address.

5. The method according to claim 4, further comprising:
determining whether the first network switch connects an end device associated with the destination or source address to the network switches of the network; and
determining the indication of the physical location as the first geolocation based on whether the first network switch connects the end device to the network switches.

6. The method according to claim 3, wherein the indication of the physical location is an automatic number identification (ANI) of the network traffic, and
wherein the error detection value includes a checksum.

7. The method according to claim 3, comprising:
determining a media access control (MAC) address of an endpoint device connected to the network via the first network switch, the endpoint device being an endpoint of the network traffic;
determining a type of device according to the MAC address; and
determining the indication of the physical location based on the type of device.

8. The method according to claim 1, wherein the value is stored in a datastore inaccessible to the processor and/or calculated by another processor, and the data is a datagram, the method further comprising:
when the error detection value does not match with the value inaccessible to the one network switch, initiating a stateful inspection of the network to determine the one or more exploits of the network that cause the mismatch.

9. An apparatus comprising:
at least one processor; and
at least one memory including computer program code for one or more programs,
the at least one memory and the computer program code configured to, with the at least one processor, cause the apparatus to perform at least the following,
determine a logical configuration of a network comprising a plurality of links connecting a plurality of nodes;
determine a physical path corresponding to one of the links, the physical path including a plurality of network switches of the network, wherein the processor is configured to determine whether data sent on one of the nodes to another one of the nodes via the one link is received at the other node;
receive an error detection value computed by a first network switch of the network switches using either data stored in one or more routing tables of the first network switch, a configuration type of the first network switch, or a combination thereof; and
validate the first network switch as secured from one or more exploits of the network by determining that the error detection value is identical to a value inaccessible to the first network switch.

10. The apparatus according to claim 9, wherein the apparatus is further caused to:
receive a second error detection value computed by a second network switch of the network switches;
compare, the second error detection value with a second value, the first and second values being inaccessible to the first and second network switches;
subsequently validate the second switch as secured from the one or more exploits by determining that the second error detection value is identical to the second value;
receive a first and second geolocation from the first and second network switches, respectively; and
determine a physical path of network traffic forwarded by the first network switch, the second network switch, or a combination thereof based on the received first and second geolocations when the first and second network switches are validated.

11. The apparatus according to claim 10, wherein the apparatus is further caused to:
determine, an indication of a physical location associated with the network traffic; and
compare the indication of the physical location with the determined physical path.

12. The apparatus according to claim 11, wherein the apparatus is further caused to:
determining a source and/or destination address of a datagram of the network traffic; and
determining the indication of the physical location according to the source and/or destination address.

13. The apparatus according to claim 12, wherein the apparatus is further caused to:
determining whether the first network switch connects an end device associated with the destination or source address with the network switches of the network; and
determining the indication of the physical location as the first geolocation based on whether the first network switch connects the end device to the network switches.

14. The apparatus according to claim 11, wherein the indication of the physical location is an automatic number identification (ANI) of the network traffic.

15. The apparatus according to claim 11, wherein the apparatus is further caused to:
determine a media access control (MAC) address of a endpoint device connected to the network via the first network switch, the endpoint device being an endpoint of the network traffic;
determine a type of device according to the MAC address; and
determine the indication of the physical location based on the type of device.

16. The apparatus according to claim 9, wherein the first error detection value is according to a configuration type and/or a datastore associated with the first network switch, the value is stored in a datastore inaccessible to the apparatus and/or calculated by another apparatus and the data is a datagram, the apparatus being further caused to initiate a stateful inspection of the network based on the comparison.

17. A method comprising:
receiving, at a network switch, network traffic comprising datagrams;
determining, by the network switch, a header of one of the datagrams, the header indicating a destination address;
selecting, by the network switch, a physical link to transport the one datagram based on the destination address;
determining, by the network switch, a network node to forward the one datagram based on the destination address;
forwarding, by the network switch, the one datagram to the network node on the physical link;
computing, at the network switch, an error detection value for the network switch using either data stored in one or more routing tables of the network switch, a configuration type of the network switch, or a combination thereof; and
forwarding the error detection value to a processing device to validate the network switch as secured from one or more exploits of the network by determining that determine whether the error detection value is identical corresponds to a value inaccessible to the network switch.

18. The method according to claim 17, further comprising:
determining the network node according to the routing table of the network switch, wherein the error detection value is computed based on values indicated in the routing table.

19. An apparatus comprising:
at least one processor; and
at least one memory including computer program code for one or more programs,
the at least one memory and the computer program code configured to, with the at least one processor, cause the apparatus embedded in a network switch to perform at least the following,
receive network traffic comprising datagrams;
determine a header of one of the datagrams, the header indicating a destination address;
select a physical link to transport the one datagram based on the destination address;
determine a network node to forward the one datagram based on the destination address;
forward the one datagram to the network node on the physical link;
compute an error detection value for the network switch using either data stored in one or more routing tables of the network switch, a configuration type of the network switch, or a combination thereof; and
forward the error detection value to a processing device to validate the network switch as secured from one or more exploits of the network by determining that the error detection value is identical to a value inaccessible to the network switch.

20. The apparatus according to claim 19, wherein the apparatus is further caused to:
determining the network node according to the routing table of the network switch, wherein the error detection value is computed based on values indicated in the routing table.

21. The method according to claim 1, wherein the one or more exploits of the network include spoofing of one or more internet protocol addresses, spoofing of one or more media access control addresses, spoofing of one or more automatic number identifications, or a combination thereof, associated with the physical path.

22. The method according to claim 1, further comprising:
when the error detection value does not match with the value inaccessible to the one network switch, determining the one or more exploits of the network that cause the mismatch by auditing the one network switch, the physical path, a logical route corresponding to the physical path, a portion of the network including the physical path, or a combination thereof.

* * * * *